Figure 1:
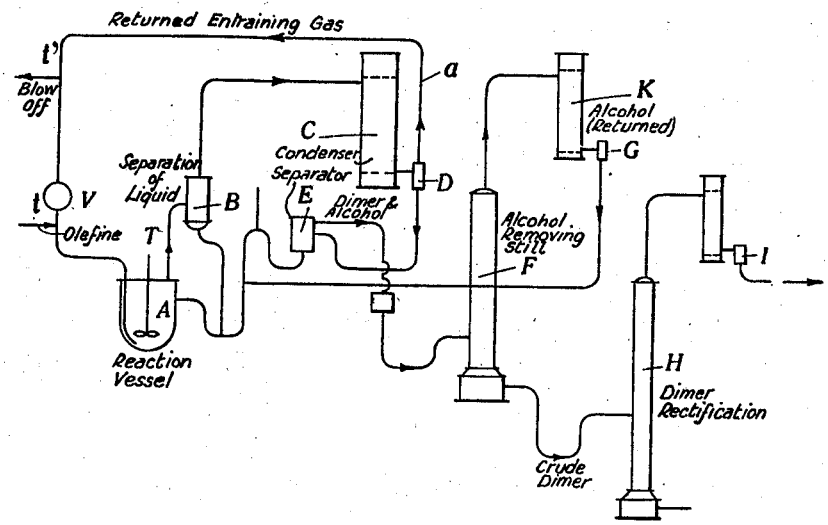

Feb. 24, 1942.   H. M. GUINOT   2,274,328

OLEFIN POLYMERIZATION

Filed Dec. 19, 1938

Inventor
Henri M. Guinot,
by
Attorney

Patented Feb. 24, 1942

2,274,328

UNITED STATES PATENT OFFICE 2,274,328

OLEFIN POLYMERIZATION

Henri Martin Guinot, Niort, Deux-Sevres, France, assignor to Les Usines de Melle, Melle, Deux-Sevres, France, a joint-stock company of France Application December 19, 1938, Serial No. 246,559½. In France December 23, 1937

5 Claims. (Cl. 260—683)

This invention relates to a process for the polymerization of olefins.

It is known that the olefins, and more especially the butenes, polymerize under the action of sulphuric acid at suitable concentration and temperature, giving a mixture of dimers and more highly condensed products. These dimers may be hydrogenated and thus give rise to derivatives which sometimes have a considerable industrial interest. Such is the case of di-isobutene, which gives iso-octane by hydrogenation; this product behaves as a remarkable fuel for modern engines as a result of its comparatively low boiling point, its large thermal energy and above all its very high anti-knocking power.

Since the polymerizing solution continuously acts upon the olefins with the formation of higher polymers, the longer it is allowed to remain in contact therewith, the difficulty associated with the production of the olefin dimers indicated above, is to stop the polymerization at the dimer stage and to prevent the wastage of the olefin in forming undesirable higher polymers. It has been found that it is possible to overcome this difficulty by continuously removing the dimer from the influence of the polymerizing solution as soon as it is formed, and also that this removal is most suitably effected by azeotropic distillation.

According to the present invention, therefore, a hydrated polymerizing reagent of any kind, for example a hot aqueous solution of sulphuric acid, is made to react on an olefin or an olefin-containing mixture, and the dimer is eliminated from the reaction vessel by azeotropic distillation as soon as it is formed. By means of this procedure the formation of trimers and more highly condensed products is completely avoided, although it has been found that the dimer of an olefin is transformed into its very heavy higher polymers if it is allowed to react for some time with the reagent which has served for its preparation; thus di-isobutene reacting with the sulphuric bath which has given rise to it from isobutene, rapidly gives heavy highly condensed hydrocarbons.

There may be used as starting material industrial gaseous mixtures containing olefins and obtained for example during the cracking of mineral oils or by dehydrogenation of saturated hydrocarbons.

It has furthermore been found that the distillation of the dimer is greatly facilitated by means of rapid circulation in a closed circuit of a gas emulsified in the polymerization reagent (i. e. this gas assists distillation by entraining dimer vapour to some extent); this gas may preferably be either the pure olefin itself or the olefin mixed with inert gases. The gaseous mixture thus passing into the hot aqueous solution of the polymerization agent becomes saturated with the vapours of the dimer formed, which is thus quickly removed (moreover it is insoluble in water and consequently capable of giving rise to an azeotropic mixture, which constitutes a condition particularly favourable for the rapid elimination of the dimer from the body of the polymerizing liquor). Only a small percentage of the total amount of olefin circulation is absorbed during a single passage through the polymerization reagent, the unabsorbed gas acting as an entrainer. By condensing off the vapours removed from the reaction vessel, a liquid is obtained which separates into two layers; the upper layer is principally formed of dimer; the lower layer is water containing a certain quantity of alcohol corresponding to the olefin treated. This aqueous layer is returned to the reaction vessel to maintain the desired concentration of the polymerization bath and also to effect the ultimate transformation of the alcohol itself into the corresponding dimer. The complete conversion into dimer of the olefin treated is thus definitely effected.

The olefin may be dissolved in an apparatus adjacent to the polymerization vessel but it is to be understood that when the polymerization vessel itself is also used for dissolving, the entraining of the dimer is necessarily effected with the olefin subjected to the reaction (pure olefin or a gaseous mixture containing it).

Operation may advantageously take place under pressure, which increases the speed of absorption and the polymerization of the olefin. In this case, however, it is preferred to effect only the polymerization under pressure and to carry out the azeotropic distillation (assisted by the rapid circulation of gas) at ordinary or reduced pressure after having released the pressure on the mixture of reactants, because if this distillation takes place under the same pressure as the polymerization, the higher temperatures necessarily used favour the production of the undesirable higher polymers. In this case the azeotropic removal of the dimer is assisted either by the injection of steam (super-heated if necessary) or again by blowing in an inert gas. This latter manner of distillation makes it possible to avoid attaining the boiling point of the mixture and the inert gas may be the olefin itself or the olefin-containing gaseous mixture.

Selective absorption between two olefins may also be carried out, as the examples given below will show.

To carry the invention into practice, the apparatus illustrated diagrammatically in the accompanying drawing may advantageously be used, although it is to be understood that these are merely examples of many types of apparatus suitable for the purposes of the present invention.

Considering Fig. 1, in a reaction autoclave A filled with a hot aqueous polymerizing liquor, the olefin (or the gaseous mixture containing it) is put in circulation by the blower V; the gas is introduced into the circuit by the pipe system $t$. The gas in circulation is emulsified in the reaction vessel A, with the polymerizing reagent by means of a suitable agitating device T. By these means the otherwise slow polymerizing reaction is accelerated and the entraining of the dimer vapour is facilitated.

The dimer is formed in A and is immediately entrained by the gaseous current together with water, and in some cases with the alcohol corresponding to the olefin treated. The vapours and gases pass through a vessel B where they are separated from any liquid which may have been entrained as such by the current of gas, and which is returned to the vessel A, and they finally pass into a condenser C where the vapours are condensed. The gases separating from the liquid in a withdrawal vessel D are returned by the pipe $a$ to the intake of the blower V and recirculated in the tank A; when an olefin mixed with other gases is used, blowing off effected by means of the pipe $t'$ prevents the accumulation of inert gases in the apparatus and permits the concentration of the olefin in the apparatus to be maintained at the desired figure; the liquids are sent into the separator E where they form two layers; the alcohol formed is distributed between the upper layer of dimer and the lower aqueous layer; this latter is continuously returned to the reaction vessel A; the upper layer passes to distillation in the column F, where the alcohol separates at the head and is condensed in K and is continually returned by G into the tank A. In the column H rectification of the dimer, which is withdrawn at I after the heavier products formed in insignificant quantity have been eliminated at the base of the column, is effected.

The apparatus may operate at ordinary pressure or at a higher pressure.

The olefins still contained in the gases blown off at $t'$ may in their turn be polymerized in an identical apparatus. To this end there is used when necessary either a more active polymerizing liquor or a higher reaction temperature, and/or again a higher working pressure.

In those cases where the gaseous mixtures to be treated contain very small proportions of olefins, the absorption tank A may be replaced by a series of tanks forming a systematic exhaustion battery.

The following examples, which are not limitative, allow the essentials of the present invention to be understood.

*Example 1*

Into a bath of 750 kilos of 50% sulphuric acid heated to 85° C., there is circulated iso-butene at a speed of 1000 m.³ per hour at atmospheric pressure. 22.5 m.³ of iso-butene per hour are thus absorbed and are polymerized with a yield of 98%; in the polymers obtained 90% are constituted by pure di-isobutene. The polymers are completely entrained by the gaseous current.

By operating under the same conditions but with butenes (1- and 2-butene) instead of iso-butene, the absorption did not exceed 1.8 m.³ per hour, so that a mixture of iso-butene and butenes treated in an apparatus and under the conditions described above would give rise to the production of di-isobutene, the butenes not being appreciably converted.

*Example 2*

A current of iso-butene is treated in a bath of 500 kilos of 60% sulphuric acid heated to 90° C., at a pressure of 7 kg. per cm.²; there is thus produced 722 kg. per hour of pure di-isobutene, compared with 53 kilos of heavier polymers. The yield is therefore 93% of di-isobutene on the total polymers.

Treated under the same conditions, the butenes (1- and 2-butene) only give 6 kg. of polymers.

Figure 2:
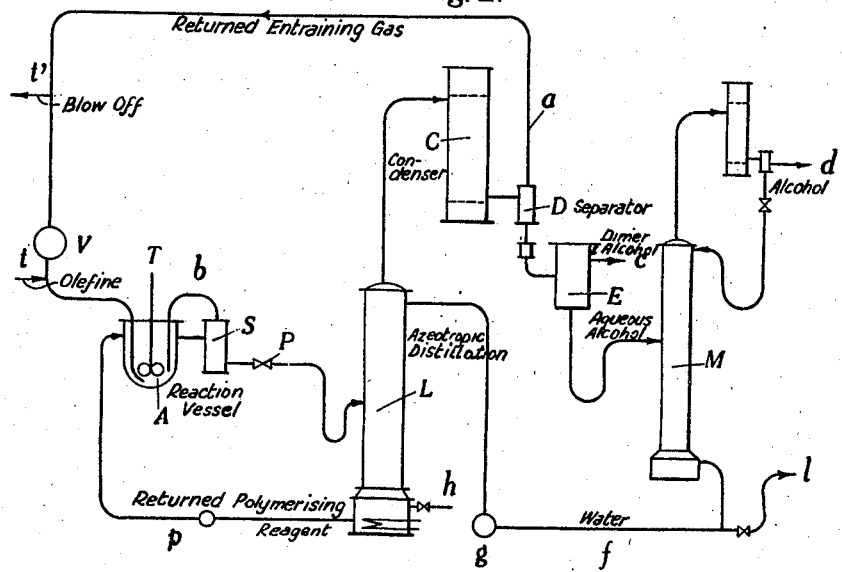

Fig. 2 illustrates one form of apparatus where the polymerizing of the olefins takes place under pressure, and this pressure is released for the azeotropic distillation of the dimer. In this apparatus, an autoclave A is charged with a suitable polymerizing bath and the olefin to be treated is fed into it through the pipe $t$ at the desired pressure by means of the blower V. The autoclave A is provided with a suitable stirring device T, capable of emulsifying the olefin finely in the polymerizing bath which is heated to the reaction temperature.

The product of the reaction in an emulsified condition is withdrawn from the autoclave by overflowing and after separation in a separator S from the emulsified gases which are returned by the pipe $b$ into the autoclave A, is released from pressure by the valve P and led into the central portion of a column L working at ordinary pressure and at the head of which the dimer separates in the form of an azeotropic mixture with water, at the same time as the dissolved gases.

After condensation in C the gases, separated in a receptacle D are returned by the pipe $a$ to the intake of the blower V as in the process described in connection with Fig. 1.

The condensed liquid is sent to the separator E, where it separates into two layers; the upper layer withdrawn by a pipe $c$, is treated, as in the apparatus shown in Fig. 1, in two columns (not shown), the branched chain alcohol eventually formed being returned into the autoclave; as for the aqueous layer, it may be returned directly to the reaction autoclave A. However, it is preferable to send it to a column M with the object of separating the alcohol which it contains from the water and to return the alcohol withdrawn at the head by $d$, to the autoclave A. The resulting pure water flowing away at the base of the column M, is returned by the pipe $f$ and the pump $g$ to the top of the separation column L where it favours the elimination of the dimer in its state of maximum purity.

A pipe $h$ is provided at the base of the column L for the injection of the inert gas or the steam, if necessary superheated. In this latter case the excess of water arising from the condensation of the injected steam is withdrawn at the base of the column M by the pipe $l$ and there is only sent to the top of the column L that quantity of water necessary for maintaining the desired concentration of the polymerizing bath.

The regenerated bath which flows away from the base of the column L is returned to the autoclave by means of a pump $p$ which ensures rapid circulation of the bath between the autoclave and the column L, an indispensable condition for obtaining a good yield by practically instantaneous elimination of the dimer formed.

A pipe $t'$ allows blowing off to be effected in order to maintain in the apparatus the desired concentration of olefin, if need arises, as in the apparatus shown in Fig. 1.

The following Example 3, shows how the invention may be carried into practice when using the apparatus shown in Fig. 2.

*Example 3*

Isobutene is emulsified in the autoclave A in 200 kilos of 60% sulphuric acid under a pressure of 7 kg. per cm.$^2$ at 90° to 95°. The pump $p$ is controlled in such a manner that the speed of circulation of the polymerizing bath is 2000 kgs. per hour. The product of the reaction is continuously led away, by overflow and after release of pressure, into the distillation column L, where the azeotrope di-isobutene-water is withdrawn at the top; there is thus obtained 240 kg. per hour of crude polymers containing 95% of di-isobutene.

It is within the scope of the invention to have in apparatus such as that shown in Fig. 2 a separation known per se to remove that layer of polymer, which is capable of separating spontaneously before the distillation. The amount of polymer in this layer however is such that a subsequent distillation of the other layer, at reduced pressure, according to the present invention, is practically indispensable for obtaining high yields and the maximum speed of reaction, because by eliminating the dimer remaining in solution, it prevents the further polymerization of this dimer and provides regenerated polymerizing reagent for returning into the cycle (i. e. the polymerizing reagent thus conserves its efficacy).

However the preliminary separation which necessarily involves a relatively prolonged contact of the dimer with the polymerizing reagent sometimes gives rise to a certain decrease in yield so that the process of immediate distillation is preferable from all points of view.

I claim:

1. A process of olefin polymerization comprising essentially treating a gaseous olefin with a hot aqueous polymerizing reagent at a super-atmospheric pressure, maintaining said polymerizing reagent at a temperature below 100° C., removing a portion of the reactants from the main body thereof, releasing the pressure on said portion of reactants, subjecting said portion of reactants to azeotropic distillation to separate olefin dimer as a water-dimer azeotropic mixture from said polymerizing reagent, assisting said distillation by the rapid passage of unreacted gas through said portion of reactants, returning said polymerizing reagent to the main body of reactants and treating said azeotropic mixture to obtain said dimeric olefin in pure form.

2. A process of olefin polymerization comprising essentially treating a gaseous olefin with a hot aqueous polymerizing reagent at a super-atmospheric pressure, maintaining said polymerizing reagent at a temperature below 100° C., removing a portion of the reactants from the main body thereof, releasing the pressure on said portion of reactants, subjecting said portion of reactants to azeotropic distillation to separate dimeric olefin as a water-dimer azeotropic mixture from said polymerizing reagent, assisting said distillation by the rapid passage of a quantity of unreacted gas through said portion of reactants, returning said polymerizing reagent to the main body of reactants, separating said dimer from said azeotropic mixture and returning the resulting residue of said azeotropic mixture to said azeotropic distillation.

3. A process as claimed in claim 2 in which said azeotropic distillation is effected, and the removal of the dimer also assisted, by blowing steam through said portion of reactants.

4. A process of olefin polymerization comprising essentially treating a gaseous olefin with a hot aqueous polymerizing reagent at a super-atmospheric pressure, maintaining said polymerizing reagent at a temperature below 100° C., removing a portion of the reactants from the main body thereof, releasing the pressure on said portion of reactants, effecting distillation of said portion of reactants to separate dimeric olefin as a water-dimer azeotropic mixture from said polymerizing reagent and assisting said separation by blowing super-heated steam through said portion of reactants, returning said polymerizing reagent to the main body of reactants, separating said dimer from said azeotropic mixture, distilling the aqueous alcoholic residue obtained from said azeotropic mixture, after separation, to separate alcohol from water, returning said alcohol to said polymerizing reagent under pressure, and returning to said azeotropic distillation such a proportion of said water that the concentration of said polymerizing reagent is not reduced.

5. A process of olefin polymerization comprising essentially treating a gaseous olefin with a hot aqueous polymerizing reagent at a super-atmospheric pressure, maintaining said polymerizing reagent at a temperature below 100° C., removing a portion of the reactants from the main body thereof, releasing the pressure on said portion of reactants, subjecting the said portion of reactants to azeotropic distillation to separate the dimeric olefin as a water-dimer azeotropic mixture from said polymerizing reagent, assisting said distillation by the rapid passage of a quantity of inert gas through said portion of reactants, returning said polymerizing reagent to the main body of reactants, separating said dimer from said azeotropic mixture, distilling the aqueous alcoholic residue obtained from said azeotropic mixture, after separation, to separate alcohol from water, returning said alcohol to said polymerizing reagent under pressure, and returning the water thus obtained to said azeotropic distillation.

HENRI MARTIN GUINOT.